US007753201B2

(12) United States Patent
King

(10) Patent No.: US 7,753,201 B2
(45) Date of Patent: Jul. 13, 2010

(54) METHOD AND APPARATUS FOR PRESERVING AND PROTECTING DATA DISCS

(75) Inventor: Mathew B. King, Aurora, CO (US)

(73) Assignee: Remember When LLC, Aurora, CO (US)

( * ) Notice: Subject to any disclaimer, the term of this patent is extended or adjusted under 35 U.S.C. 154(b) by 583 days.

(21) Appl. No.: 11/674,039

(22) Filed: Mar. 21, 2007

(65) Prior Publication Data
US 2007/0162921 A1 Jul. 12, 2007

Related U.S. Application Data

(63) Continuation-in-part of application No. 10/611,108, filed on Jun. 30, 2003, now abandoned.

(51) Int. Cl.
B65D 85/57 (2006.01)
(52) U.S. Cl. .................................................. 206/308.1
(58) Field of Classification Search ................ 206/307, 206/308.1, 309–313, 493; 369/292.1; 720/718, 720/719
See application file for complete search history.

(56) References Cited

U.S. PATENT DOCUMENTS

| 3,774,757 | A |   | 11/1973 | Harris et al. ................ 206/313 |
| 3,961,656 | A | * | 6/1976  | Aggarwal .................... 206/309 |
| 4,072,229 | A |   | 2/1978  | Lloyd et al. ................. 206/309 |
| 4,736,840 | A |   | 4/1988  | Deiglmeier .............. 206/308.1 |
| 4,879,710 | A |   | 11/1989 | Iijima ...................... 206/308.1 |
| 5,020,048 | A | * | 5/1991  | Arai et al. ................... 720/718 |
| 5,263,581 | A |   | 11/1993 | Rosen ..................... 206/308.1 |
| 5,725,934 | A | * | 3/1998  | Gallant .................... 428/195.1 |
| 6,262,969 | B1| * | 7/2001  | Ito et al. ..................... 720/719 |
| 6,443,299 | B2|   | 3/2002  | Kuremoto et al. ........ 206/308.1 |
| 6,385,164 | B1|   | 5/2002  | Winicki ...................... 369/283 |
| 6,386,361 | B1|   | 5/2002  | Ting ........................ 206/308.1 |
| 6,427,833 | B1|   | 8/2002  | Hui ............................ 206/310 |
| 6,446,417 | B1|   | 9/2002  | Lux, Jr. et al. ........... 206/308.1 |
| 6,454,087 | B2|   | 9/2002  | Gordon et al. .............. 206/217 |
| 6,463,026 | B1| * | 10/2002 | Anderson .................. 720/719 |
| 6,581,766 | B2|   | 6/2003  | Hui ........................ 206/308.1 |
| 7,059,475 | B2|   | 6/2006  | Zabka et al. ................ 206/710 |
| 2001/0000599 | A1| * | 5/2001 | Belden, Jr. .................. 206/310 |

OTHER PUBLICATIONS

Hart, Russell, "Archiving Digital: The care and feeding of data disks," American Photo, May/Jun. 2006, pp. 40-42.

* cited by examiner

Primary Examiner—Luan K Bui
(74) Attorney, Agent, or Firm—Merchant & Gould P.C.

(57) ABSTRACT

A data disc protector and a method for using same to protect data discs stored in data disc storage cases is disclosed. Embodiments of the data disc protector comprise a protective sheet of material sized to fit between a data disc and a back cover of a data disc storage case and adapted to form a barrier between the back cover and the data disc when sandwiched between a data disc and the back cover. The data disc protector forms a physical barrier inhibiting the transfer of airborne hydrocarbons emitted by plastics in the storage case to the disc and preventing the data disc from contacting the back cover during storage. Embodiments of the data disc protector are made of a material that traps hydrocarbons. Embodiments of the data disc protector are provided with a central aperture adapted to allow installation on a hub in the storage case.

5 Claims, 13 Drawing Sheets

METHOD AND APPARATUS FOR PRESERVING AND PROTECTING DATA DISCS

This application is a continuation in part of U.S. patent application Ser. No. 11/611,108 filed on Jun. 30, 2003, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This application relates generally to protecting a data disc from degradation and more particularly to a protector apparatus and method for preventing damage to a data disc stored in a storage case.

Data discs, such as compact discs ("CDs") and digital vided discs ("DVDs"), typically have large amounts of digitally stored information (data) that is optically readable via a laser mounted on a movable head during rotation of the disc. Data discs are made from laminated layers of plastic. The information is arranged in one or more data layers on circular tracks that can be accessed by the laser through a transparent back layer of the disc. Multiple data layers may be separated by interspersing layers. In addition, discs are typically covered by a protective top layer of the disc that can have labeling applied thereto such as by silkscreening, thermal printing or ink jet printing.

Protective storage cases are typically used to store and protect the data discs. Prior art storage cases typically comprise a top cover or door side, and a back cover or disc side. Each cover is pivotably coupled to a central spine portion to form what is referred to as a "living hinge." The living hinge allows the covers to pivot toward each other to close the case and encapsulate the disc. The storage cases are typically made of polypropylene, vinyl, or some other plastic for durability. There are many examples of such storage cases in the art.

The discs are typically held in the storage case via a hub on the disc side designed to penetrate a central hole in the disc. The hub is typically equipped with a retaining mechanism that holds the disc within a disc-shaped recess, sometimes referred- to as a disc retention surface, in the storage case.

Data discs may be easily damaged in a number of ways. For example, the bottom of transparent surface of the discs may be scratched rendering the discs unusable. Another common form of damage occurs when the laminated layers of the discs become separated. The separation may be due to repeated thermal stress or can be the result of repeated flexing of the discs. It should be noted, that recordable disks such as CD-Rs, CD-RWs, and DVD-Rs, are more susceptible to the delamination than read-only discs because of their method of construction.

Another, less well known, source of damage to data discs occurs due to long term degradation of the discs while in storage. As discussed above, most data discs are stored in storage cases. It has been determined that long term storage of data discs in storage cases such as those described above actually accelerates the degradation of the data discs over the long term in several ways.

First, the bottom layer of the data disc may be "clouded" by long term storage in a plastic storage case. Plastics, as is well known, "off gas" or emit various hydrocarbons and petroleum-based gases over time as part of their curing and degradation process. When exposed to heat, the off-gassing problem is exacerbated. It has been found that these hydrocarbon gases can cloud the bottom transparent layer (the "data surface") of the disc. The clouding may be due to physical deposition of the gas on the data surface. In addition, the gases may also react with the plastic of the disc to cause chemical clouding. The clouding reduces the transparency of the transparent layer of the data surface of the disc and therefore inhibits the ability of laser to read the data stored within the disc, ultimately rendering the disc unreadable. Long term storage, especially if coupled with exposure to heat also may cause the storage case material to bond with or otherwise physically attach to any portion of the disc that is in contact with the case, further damaging the disc.

Discs may also be damaged by repeated removal and replacement of the discs from the cases. Many users typically bend data discs when removing them from storage cases or replacing them. This occurs because often when the restraining mechanism of the hub is pressed to release the disc, it does not effectively eject the disc from the case. The user is then forced to attempt to grasp an edge of the disc and lift it from the case. Often this will result in a slight flexing of the disc which, over time, can lead to the separation of laminated layers as well as scratches to the bottom surface. In addition, in most cases it is nearly impossible for users to remove a disc from the case without forcing at least some portion of the disc surface (typically the data surface) to contact the case. This leads to an accumulation of scratches on the data surface over time.

Yet another drawback of a typical storage cases is that the retention device in the hub often does not hold the disc firmly so that the disc does not rattle or vibrate within the case. This can occur for several reasons, and is often due to damaged retention devices caused by users improperly removing or replacing a disc. Loose discs will rattle and impact against the case when exposed to vibration.

Even with these drawbacks, storage cases have become extremely popular. However, as data discs are relatively new, most consumers are unaware that the storage cases will damage discs stored in them over the long term. Now that the problem has been identified, there is a need for a way to protect data discs that are to be stored for a long period of time in typical storage cases. The present invention provides a solution to this and other problems, and offers other advantages over the prior art.

SUMMARY

Against this backdrop the present invention has been developed. A data disc protector and a method for using same to protect data discs stored in data disc storage cases is disclosed. Embodiments of the data disc protector comprise a protective sheet of material sized to fit between a data disc and a back cover of a data disc storage case and adapted to form a barrier between the back cover and the data disc when sandwiched between the data disc and the back cover. The data disc protector forms a physical barrier inhibiting the transfer of airborne hydrocarbons emitted by plastics in the storage case to the disc and preventing the data disc from contacting the back cover during storage. Embodiments of the data disc protector are made of a material that traps hydrocarbons. Embodiments of the data disc protector are provided with a central aperture adapted to allow installation on a hub in the storage case. Embodiments of the data disc protector are made from a compressible material that assists in the retention and disengagement of data discs retained in the storage case.

These and various other features as well as advantages which characterize the present invention will be apparent from a reading of the following detailed description and a review of the associated drawings.

DETAILED DESCRIPTION

Figure 1A:
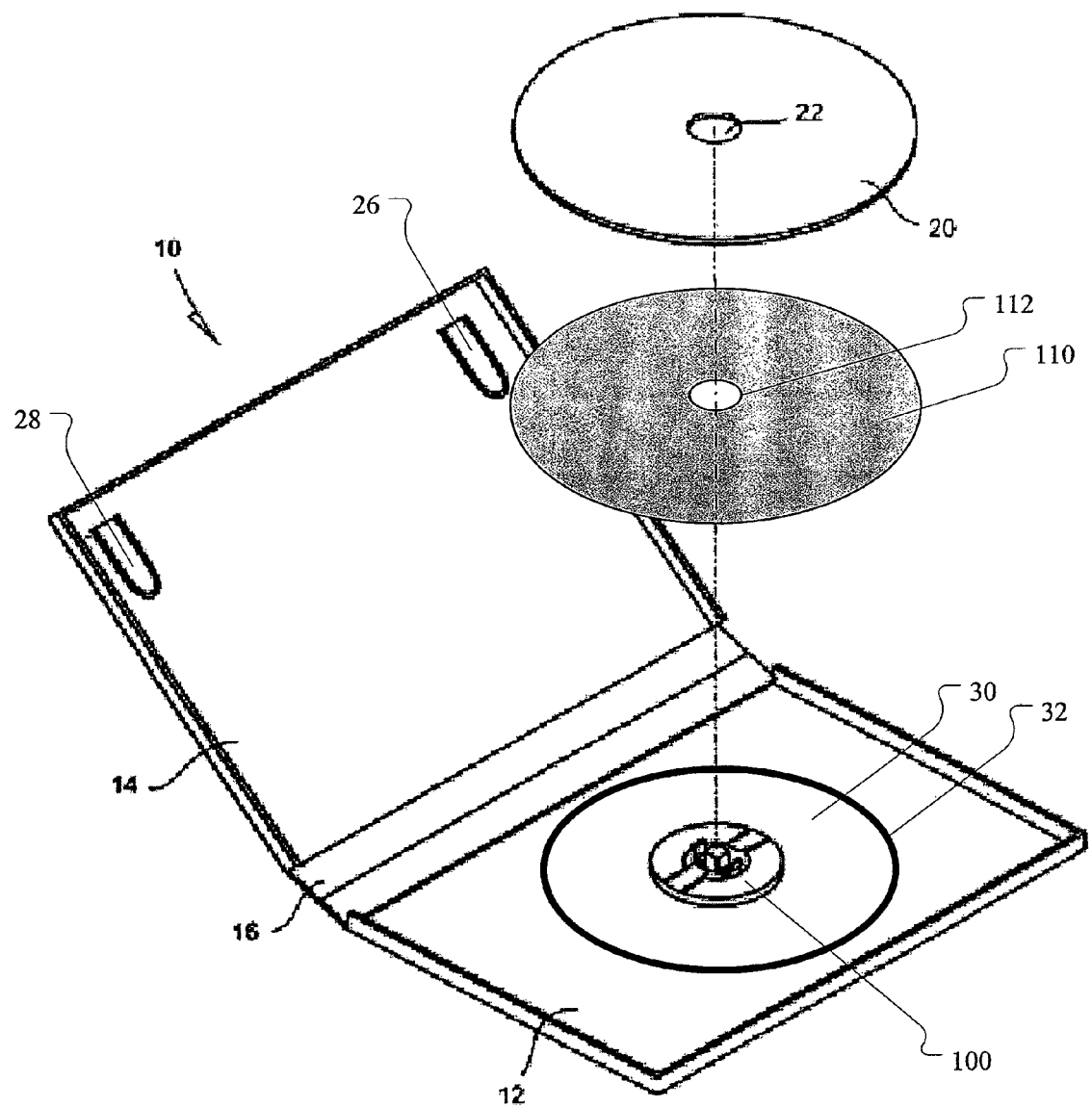
FIG. 1A is a perspective view of a typical data disc storage case, a data disc, and an embodiment of a data disc protector in accordance with the present invention.

FIG. 1A is a perspective view of a typical data disc storage case 10 and an embodiment of a data disc protector 110 in accordance with the present invention. FIG. 1A shows a typical folding data disc storage case 10 for holding a data disc 20 such as a DVD, HD-DVD, Blu-ray Disc, VCD, CD, CD-ROM disc, mini disc, or other optical disc-type media now known or yet to be developed.

The storage case 10 has a front cover 14 connected by a hinge portion 16 to a back cover 12. The front cover 14 and back cover 12 fold together via the hinge portion to enclose a compartment. The compartment is typically sized to hold at least one data disc 20 and may also contain room for a small booklet (not shown). For example, in the storage case embodiment shown in FIG. 1A there are two retention clips 26, 28 on the front cover adapted to retain a booklet or information sheet (not shown). Typical storage cases 10 incorporate plastic components. For example, the storage cases 10 such as that shown in FIG. 1A are often made entirely of plastic, being stamped, molded, or otherwise formed from a single piece of plastic.

Storage cases may be equipped with many different devices for retaining one or more data discs 20. The storage case shown in FIG. 1A shows one common device, a hub portion 100 on the back cover 12. The hub portion 100 is adapted to engage and retain a data disc 20 by its central hole 22. This is typically achieved by including some type of retaining device as part of the hub portion. Hub portions 100 adapted to retain data discs 20 are well known in the art. Typically, the hub portion 100 is adapted to engage and retain the data disc 20 against the back cover 12 so that at least some portion of the data disc 20 is pressed against the back cover 12 when the data disc 20 is retained on the hub portion 100. As mentioned above, a hub portion is just one means for retaining a data disc in the storage case 10. Other means are well known in the art and are also contemplated and suitable for use with embodiments of the present invention. For example, storage cases containing sleeves, notches for engaging an edge of a disc and opposing pressure points are possible.

As discussed above, a data disc 20 typically includes a data surface and a labeled surface. It is common for users to place data discs in a storage case 10 such as the one shown in FIG. 1A with the data surface facing the back cover 12, so that the labeled surface faces the user when opening the storage case 10. When stored in this manner, the data surface of the data disc 20 may come into contact with the back cover 12 during transportation of the storage case 10 and when the user removes the data disc 20. In some storage cases, a data disc retention surface 30, sometimes including a contact ring 32, may be included in the back cover 12. This may be designed to limit the contact of the data surface to specific locations on the data surface. For example, in FIG. 1A, a retained data disc will physically contact at least a portion of the data disc retention surface 30 of the back cover 12. In the embodiment of the storage case 10 shown, the data disc retention surface 30 includes that portion of the storage case 10 the data surface of a retained data disc 20 contacts while in storage and that portion of the storage case 10 that the data surface is directly exposed to. For example, the data disc retention surface 30 of the storage case 10 shown in FIG. 1A includes the contact ring 32, a portion of the flange around the hub portion 100 and that portion of the back cover 12 between the contact ring 32 and the hub 100. Other configurations are possible.

One common element of the data disc storage cases 10, is that the data surface of a retained data disc 20 is exposed to airborne hydrocarbons that are emitted by the plastic into the storage compartment. This occurs even when a data disc retention surface 30 is provided and there is substantially no air flow between the space created between the data disc retention surface 30 and a retained data disc 20, and the rest of the storage compartment. This is because the data retention surface 30 is itself made of plastic and hydrocarbons are thus emitted directly into the space created between the data disc retention surface and a retained data disc 20. As discussed in the background, it is important to reduce the exposure of the data surface of the data disc to such emitted airborne hydrocarbons to prevent clouding of the data surface.

An embodiment of a data disc protector 110 in accordance with the present invention is shown in FIG. 1A. The data disc protector 110 is designed to be sandwiched between the data disc's 20 data surface and the back cover 12 of the storage case 10. When sandwiched in this manner, the data disc protector forms a physical and a chemical barrier between a retained data disc 20 and the back cover 12. Furthermore, the data disc protector 110 when sandwiched between a data disc 20 retained on the hub portion 100 and the back cover 12 prevents the retained data disc 20 from coming into physical contact with the data disc retention surface 30.

The data disc protector 110 may be made of a soft and thin sheet of protective material which does not scratch or scuff the surface of the data disc. The material can be made of fabric or cloth. One embodiment of a data disc protector was made from Airtex decking material which is a nylon/cotton/flame retardant blend commonly used in the manufacture of household furniture and furniture for aircraft and automobiles. One benefit of the Airtex material is that it does not emit, and in fact absorbs hydrocarbons. This allows the data disc protector 110 to act like a chemical barrier that absorbs hydrocarbons as the hydrocarbons attempt to diffuse through the material. In the embodiment, the cotton of the Airtex material absorbs and/or adsorbs hydrocarbons while the nylon prevents the protective sheet from scratching the surface of data disc it contacted. This material provided a physical and chemical barrier, was soft and did not excessively wear the surface of the data disc, and also provided sufficient compression to firmly hold and assist in the release of a retained data disc (see below for a more detailed discussion of the desirability of a compressive material). Other materials are also suitable including natural fabrics such as cotton and wool. Synthetic fabrics and blends of hydrocarbon absorbing materials and synthetic fabrics are, too, suitable. However, for those materials care should be taken to ensure that the sheet does not, on the whole, emit hydrocarbons.

In one embodiment, the data disc protector 110 may be made of commercially-available polypropylene fabric. For example, this polypropylene fabric (identified as Chemical Abstracts Service (CAS) number 9003-07-4) is a suitable fabric that absorbs and/or adsorbs hydrocarbons. The polypropylene fabric may be a non-woven or woven variety. The polypropylene fabric may be spunbonded or meltblown.

In one embodiment, the data disc protector 110 may be made of a fabric specifically designed to have a large effective surface area. A large effective surface area may provide adsorbation sites for air-borne hydrocarbons. For example, a polypropylene fabric, a micro-fiber fabric, or a fabric specially treated to increase the fabric's effective surface area may be used.

In one embodiment, the data disc protector 110 may adsorb air-borne hydrocarbons. The data disc protector may physically, mechanically, or chemically adsorb air-borne hydrocarbons, depending partly on the type of material of the data disc protector and partly on the type of hydrocarbon. In another embodiment, the data disc protector may absorb air-borne hydrocarbons. In yet another embodiment, multiple mechanisms and/or reactions may be used by the data disc protector to trap hydrocarbons in air which contacts or passes through the data disc protector. The data disc protector may be treated (e.g., chemically coated) to affect the mechanisms and/or reactions of the data disc protector with hydrocarbons. Regardless, the hydrocarbons are prevented by the data disc protector from depositing onto the data surface of the disc.

Embodiments of the data disc protector 110 are also made out of a compressible material. When a compressible data disc protector 110 is sandwiched between a data disc 20 and the back cover 12, the data disc 20 must be forced onto the hub portion 100 by compressing at least a portion of the data disc protector 110. The compression causes the compressed portion of the data disc protector 110 to act like a spring having stored potential energy. While the disc 20 is retained, a force is applied between the retained data disc 20 and the retention device included in the hub portion 100. The force causes the data disc 20 to be tightly retained and prevents the data disc from rotating about the hub 100. This is beneficial as it prevents wear on the central hole 22 of the data disc 20. It also generally inhibits movement of the data disc 20 during transportation of the storage case, thus reducing unwanted impacts between the data disc and the disc retention surface 30.

Another advantage of the compressible data disc protector 110 is that it allows a user to orient the label of the data disc 20 so that it matches the orientation of a label on the folding data disc storage case 10. Without the compressive force on the data disc, most storage cases 10 with hub portions 100 allow a retained data disc 20 to rotate about the hub portion 100. This means that each time a storage case is opened, the data disc 20 will be in a random orientation relative to the label on the storage case 10. Use of a compressible data disc protector 110 prevents this rotation and keeps the data disc in the orientation in which it is installed in the storage case 10.

The spring action of the compressed data disc protector 110 also assists the user in disengaging the data disc from the hub portion 100. When the data disc 20 is disengaged, the potential energy is released and the data disc 20 is pushed away from the back cover 12 and off the hub portion 100 as the data disc protector 110 springs back to its original thickness. This allows the user to easily remove the data disc 20 without having to bend the disc 20 in order to remove it from the hub portion 100. As discussed above, bending data discs can significantly damage them. Thus, the spring action provided by a compressible data disc protector 110 will increase the useable life of a data disc. The data disc protector 110 also assists in the disengagement of a retained data disc 20 by allowing a user to pull substantially horizontally (i.e. in the, plane of the data disc 20) on an edge of the data disc protector 110 that extends beyond the retained data disc 20. This causes the data disc 20 to be lifted away from the data retention surface 30 without flexing the data disc 20.

The data disc protector 110 shown in FIG. 1A is shown having a central aperture 112 sized to receive the hub 100 and allow the data disc protector to be installed on the hub. The actual size of the aperture is determined by the size of the hub portion 100 that the data disc protector 110 is to be installed upon. The central aperture 112 is only necessary when used in conjunction with storage cases that use a hub portion 100 to retain data discs. Alternative embodiments of the data disc protector 110, for example those designed for use with storage cases having sleeves, do not include a central aperture. In the alternative embodiments, the data disc protector 110 comprises sheets of protective material sized and shaped to be used in conjunction with the storage case's specific retention device.

Yet another advantage of the data disc protector 110 is that it forms a diffusion barrier between the data surface of the data disc 20 and the back cover 12. This barrier inhibits the transfer of hydrocarbons between the data surface of the data-disc 20 and the data disc storage case 10. As discussed above, plastic emits hydrocarbons in the air that are detrimental to data discs 20. Storage cases 10 made of or with plastic will emit hydrocarbons into the storage compartment. These hydrocarbons may react with or otherwise degrade a retained data disc over time. By providing a data disc protector 110 that forms a physical barrier between the data surface of the data disc 20 and the back cover 12, the transfer of hydrocarbons between the back cover 12 and the data surface will be inhibited, thus reducing the degradation of the data surface over time.

Embodiments of the data disc protector 110 go further by making the data disc protector 110 out of a protective sheet of material that traps, chemically or physically, hydrocarbons. The material may chemically absorb the hydrocarbons by binding to them, as discussed above. For example, this can be achieved by including a small amount of activated carbon within the protective sheet. Another embodiment uses a sheet that comprises a micro mesh of material that physically traps the hydrocarbons with the mesh.

Figure 1B:
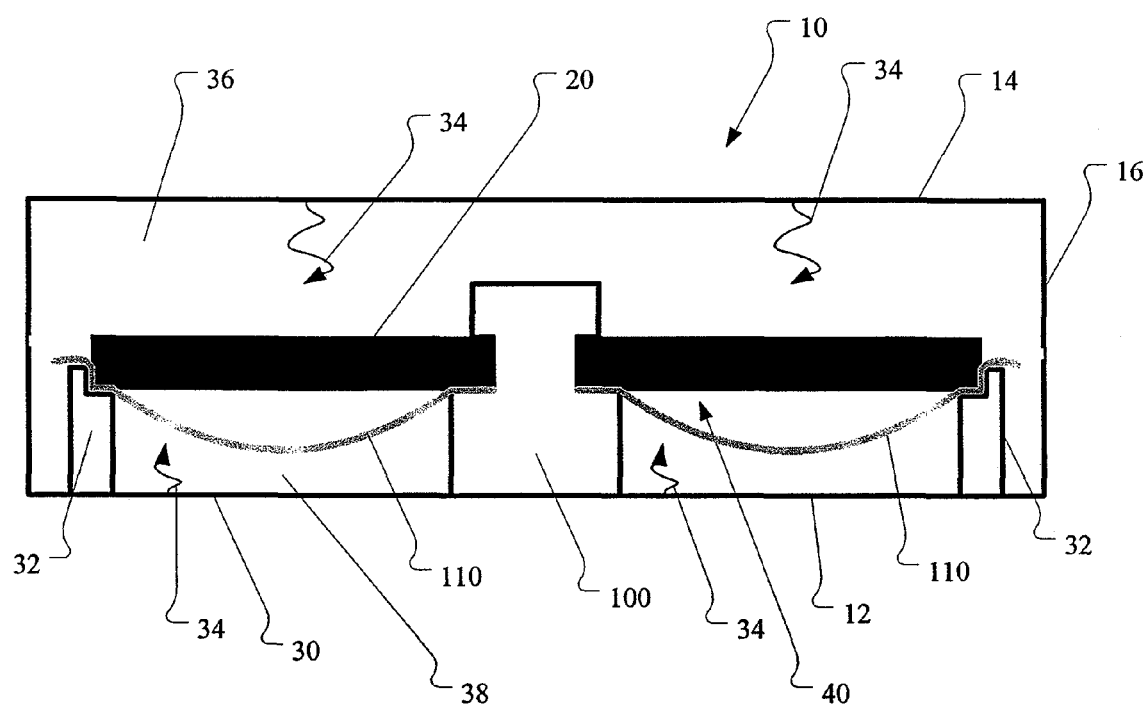
FIG. 1B is a cross sectional view of a data disc protector installed on a hub of a storage case and sandwiched between the case's back cover and a data disc retained on the hub in accordance with the present invention.

FIG. 1B is a cross-sectional view of a data disc 20 retained on the hub portion 100 in the storage case 10 of FIG. 1A showing the data disc protector 110 therebetween. A cross section of the folding data disc storage case 10 (in a closed aspect) through the center of the hub portion 100 is shown. FIG. 1B clearly shows the storage compartment 36 formed when the front cover 14 and the back cover 12 are folded together. Also shown is the second compartment 38 formed between the data disc retention surface 30 and the data surface 40 of a data disc 20 retained on the hub 100. The second compartment being defined by the contact ring 32, the data disc retention surface 30 of the back cover 12, the data surface 40 of the data disc 20, and the hub portion 100. FIG. 1B shows an embodiment of a flexible data disc protector 110, sandwiched between the data disc 20 and the back cover 12. Note that the flexibility allows the data disc protector 110 to contact the data disc's data surface 40 substantially only in those locations where the data disc 20 would otherwise contact the data disc retention surface 30 (in this case the hub portion 100 and the contact ring 32) if there were no data disc protector 110.

FIG. 1B further illustrates the emission of hydrocarbons 34 into the storage compartments as signified by the wavy arrows. In the embodiment shown, the folding data disc storage case 10 is made entirely of plastic and hydrocarbons 34 are constantly emitted into the storage compartments. An inspection of the data disc protector 110 shows that it serves as a physical barrier to the hydrocarbons 34 emitted by the data disc retention surface 30 in the second compartment 38. Furthermore, the data disc protector serves as a seal between the data disc retention surface 30 and the data surface 40 from the main storage compartment 36 (in the embodiment shown, by acting as a seal between the contact ring 32 and the data disc 20) and the airborne hydrocarbons 34 emitted into it.

The folding data disc storage case of FIGS. 1A and 1B is but one example of a data disc storage case for which embodiments of the present invention are suitable for use. Other data storage case designs are also applicable, such as a "jewel" case or a folding 'book' containing leaves wherein each leave retains one or more data discs either in a sleeve or by some other means. Another example of a data disc storage case is a cylindrical case that has a circular base portion with a cylindrical hub extending therefrom sized to penetrate the central aperture of data discs. The cylindrical hub will typically have a length capable of holding a number of data discs, such as for example 10 discs. The cylindrical case also includes a cylindrical cover that fits over the hub and engages the base to enclose any data discs retained on and penetrated by the hub. Such cylindrical cases are common for storing CD-Rs.

Figure 2:
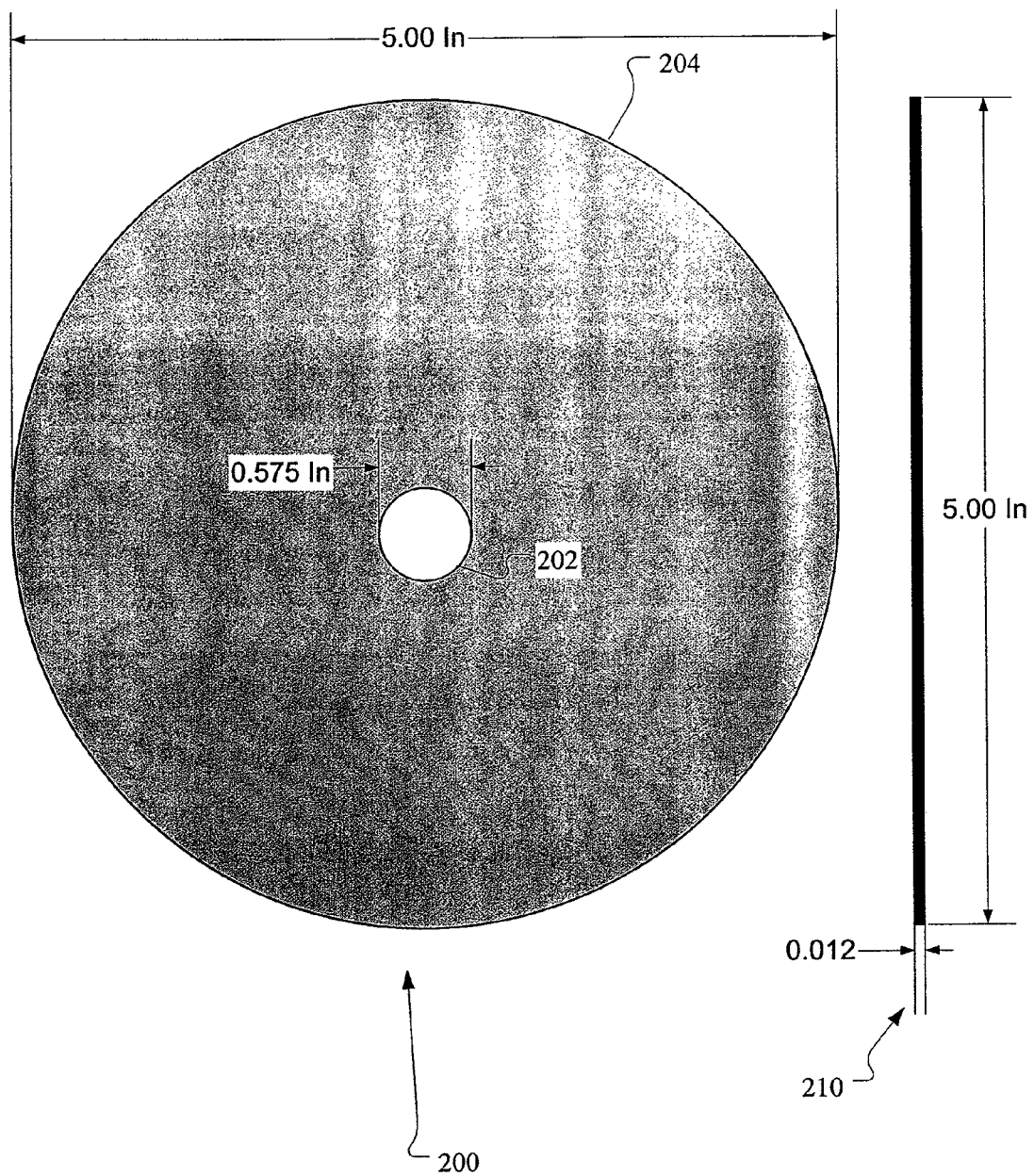
FIG. 2 is a plan view of an embodiment of data disc protector for CDs and DVDs.

FIG. 2 is a plan view of an embodiment of data disc protector 200 sized for to protect a standard compact disc (CD) or Digital Video Disc (DVD) while stored in an embodiment of a typical, plastic storage case equipped with a hub portion such as that shown in FIG. 1A. The data disc protector 200 shown has a central aperture 202 with a diameter of 0:575 inches, an outer diameter 204 of 5.0 inches and a width 210 of 0.012 inches. The 0.575 inch aperture 202 diameter is preferable, but acceptable diameters range from 0.59 and 0.55 inches. For an outer diameter 204, while the preferred diameter is 5.0 inches, acceptable diameters range from 4.5 to 7.5 inches. When not compressed, embodiments of the data disc protector 200 preferably have a width 210 ranging from 0.01 to 0.1 inches, ranging more preferably from 0.015 to 0.01 inches and most preferably from 0.012 to 0.015 inches. When compressed, embodiments of the data disc protector 200 preferably have a width 210 ranging from 0.001 to 0.05 inches, ranging more preferably from 0.005 to 0.025 inches and most preferably from 0.005 to 0.01 inches. In an embodiment of the present invention, the data disc protector 200 had a width 210 of 0.0075 inches when fully compressed.

Figure 3:
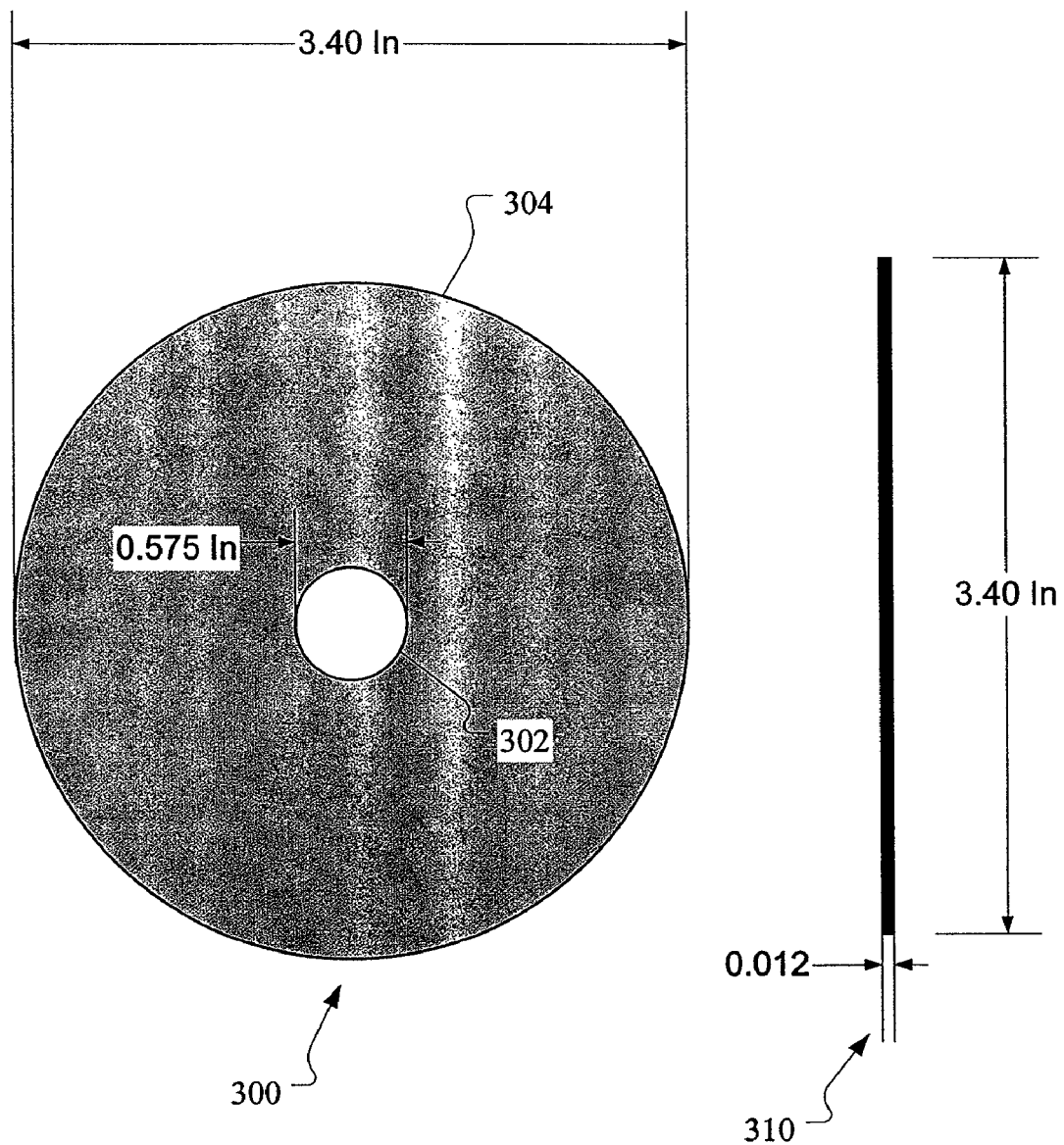
FIG. 3 is a plan view of an embodiment of data disc protector for mini discs.

FIG. 3 presents an alternative embodiment of the present invention for use with a mini data disc in a folding data storage case adapted to retain mini discs. The data disc protector 300 shown has a central aperture 302 with a diameter of 0.575 inches, an outer diameter 304 of 3.40 inches and a width 310 of 0.012 inches. The 0.575 inch central aperture 302 diameter is preferable, but acceptable diameters range from 0.59 and 0.55 inches. For an outer diameter 304, while the preferred diameter is 3.4 inches, acceptable diameters range from 3.0 to 7.5 inches. When not compressed, embodiments of the data disc protector 300 preferably have a width 310 ranging from 0.01 to 0.1 inches, ranging more preferably from 0.015 to 0.01 inches and most preferably between 0.012 and 0.015 inches. When compressed, embodiments of the data disc protector 300 preferably have a width 310 ranging from 0.001 to 0.05 inches, ranging more preferably from 0.005 to 0.025 inches and most preferably between 0.005 and 0.01 inches. In an embodiment of the present invention, the data disc protector 300 had a width 310 of 0.0075 inches when fully compressed.

Figure 4:
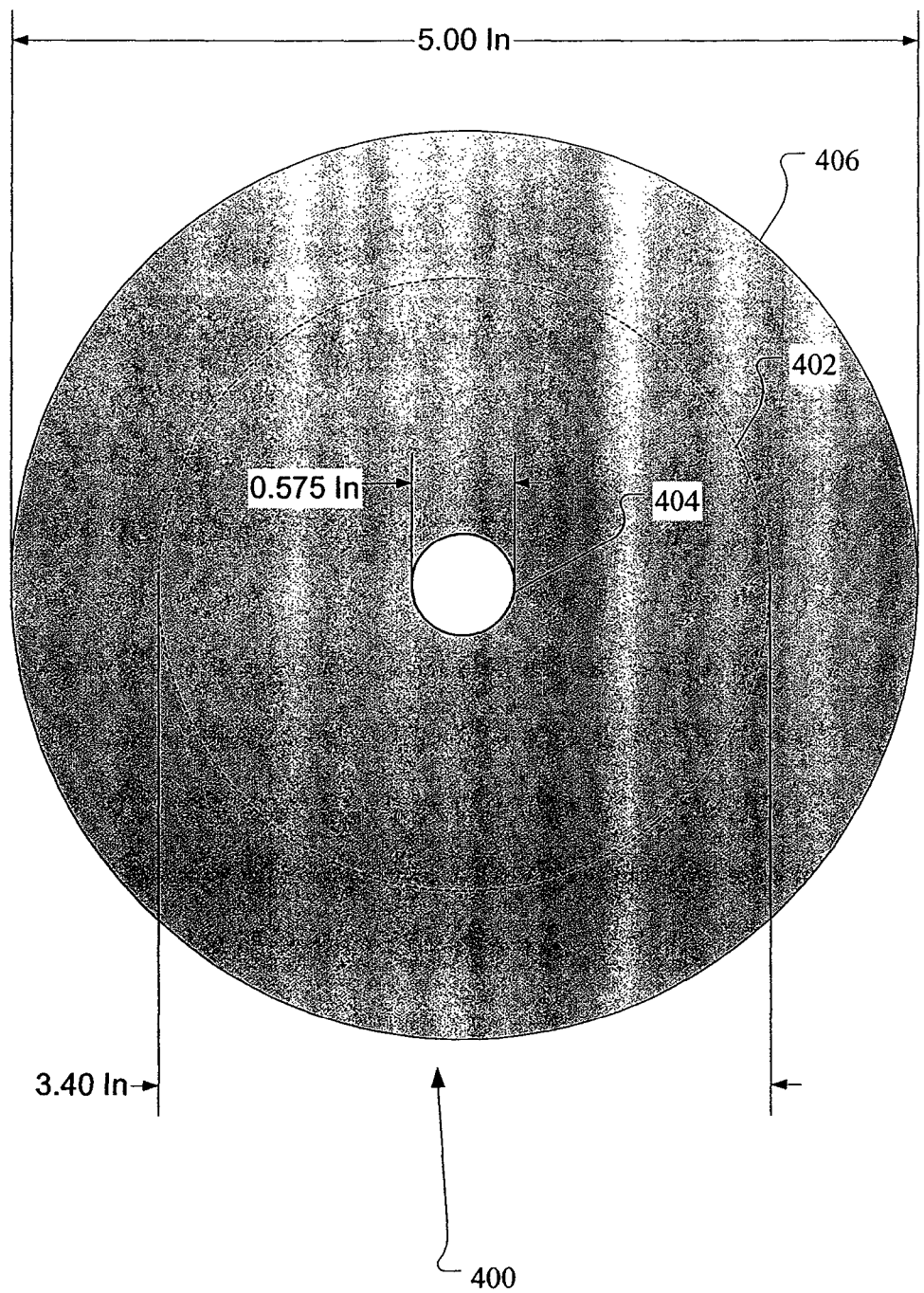
FIG. 4 is a plan view of an embodiment of a data disc protector having a perforated ring.

FIG. 4 shows a third embodiment a data disc protector 400 in accordance with the present invention. The data disc protector 400 is similar to that shown in FIG. 2 in size and preferable ranges. However, the disc protector 400 is provided with a ring 402 of perforations between the central aperture 404 and the outer diameter 406. The ring 402 defines a second diameter so that when the perforations are torn and the material between the outer diameter 406 and the ring 402 is removed, the data disc protector 400 now has a new outer diameter equal to that of the ring 402. This allows the disc to be used to protect data discs such as CDs and DVDs or modified (by tearing the perforations and removing the outer portion of protective material) to be used to protect a second data disc of a smaller size. In the embodiment shown in FIG. 4, for example, the ring 402 is sized to allow the data disc protector 400 to be modified to protect standard mini discs. It will be immediately suggested to one skilled in the art that numerous such rings 402 may be provided allowing the data disc protector 400 to be modified to be used with multiple data disc sizes and, even, multiple hub sizes.

Yet another embodiment is a data disc protector 400 provided without a central aperture 404, but provided with one or more rings 402 of perforations allowing the data disc protector 400 to suitable for use with hub-less storage cases while still easily modifiable for use with data disc storage cases that utilize a hub to retain data discs while in storage.

Figure 5:
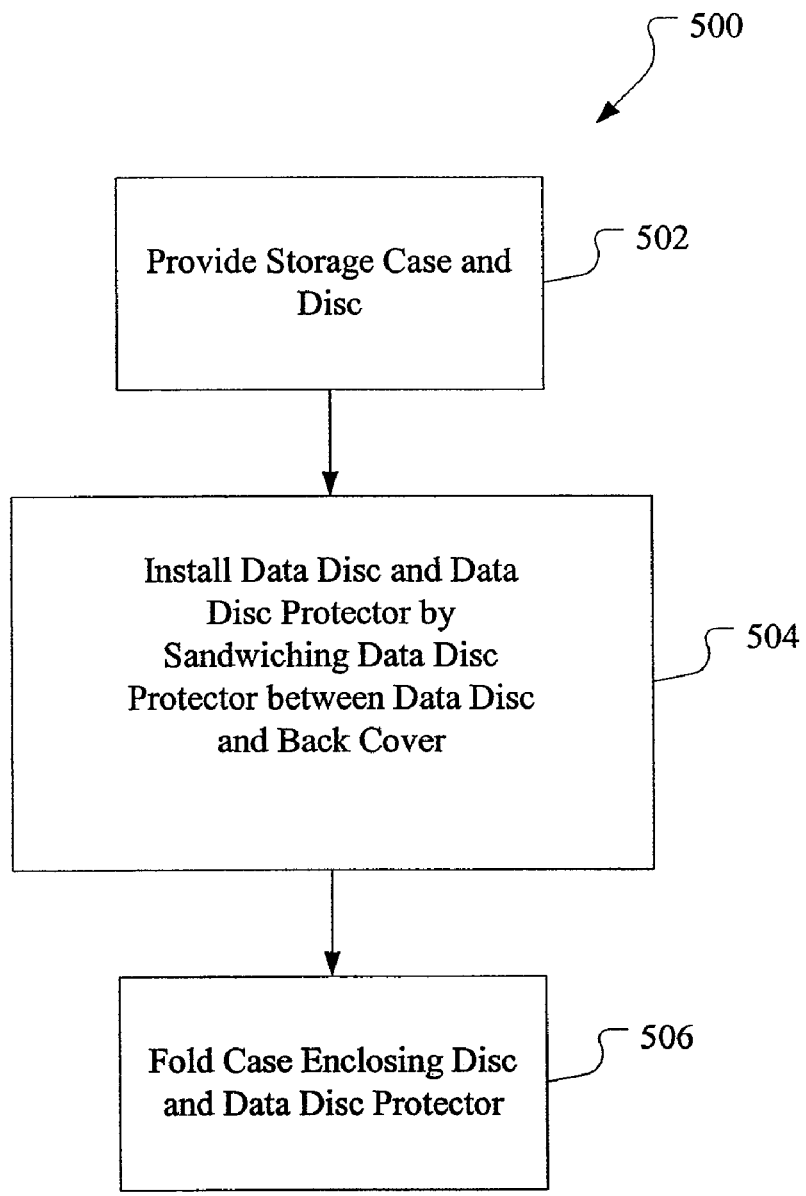
FIG. 5 is a flow chart showing a method of protecting a data disc during storage with an embodiment of a data disc protector.

FIG. 5 presents an embodiment of a method of protecting a data disc during storage using a data disc protector. The method 500 starts with a providing operation 502 in which a folding data disc storage case and a data disc to be installed in the storage case are provided. The provided folding data disc storage case includes a back cover and a front cover that are adapted to fold together to enclose the data disc. The back cover is further adapted to retain the data disc against the back cover.

After providing the storage case and data disc, in an installation operation 504 a data disc protector is installed on the back cover followed by the installation of the data disc so that the data disc protector is sandwiched between the data disc to form a barrier between a data surface of the data disc and the storage case.

Finally, the method ends with folding operation 506 wherein the data disc storage case being folded to enclose the retained data disc. The method protects the data surface of the data disc by providing a physical barrier between the data disc and storage case to inhibit the transfer of hydrocarbons from the storage case to the data disc and further protects the data disc from contact with the storage case.

If the data disc storage case provided in the providing operation utilizes a hub to retain the data disc, then the installation operation 504 includes installing the data disc protector on the hub to place it adjacent to the back cover and a data disc retention surface, if any. Then the data disc is engaged and retained on the hub with the data surface of the data disc facing the data disc protector.

Furthermore, if the data disc protector is a compressible embodiment of the data disc protector, the installation operation 504 includes a compressing operation (not shown) compressing the data disc protector between the back cover and the data disc. The compressing operation stores potential energy in the data disc protector which will be released when the data disc is disengaged from the hub.

The installation operation 504 may also include an orientation operation (not shown) wherein a label on the data disc is oriented to a preferred viewing orientation. For example, the preferred viewing orientation may be one where the data disc label and a label on the storage case have the same viewing orientation.

Yet another embodiment of the method 500 includes fixing the data disc protector to the folding data disc storage case as part of the installation operation 504. For example, the data disc protector may be built into the back cover as a permanent element by fixing it to the back cover using adhesive or a mechanical attachment.

Figure 6A:
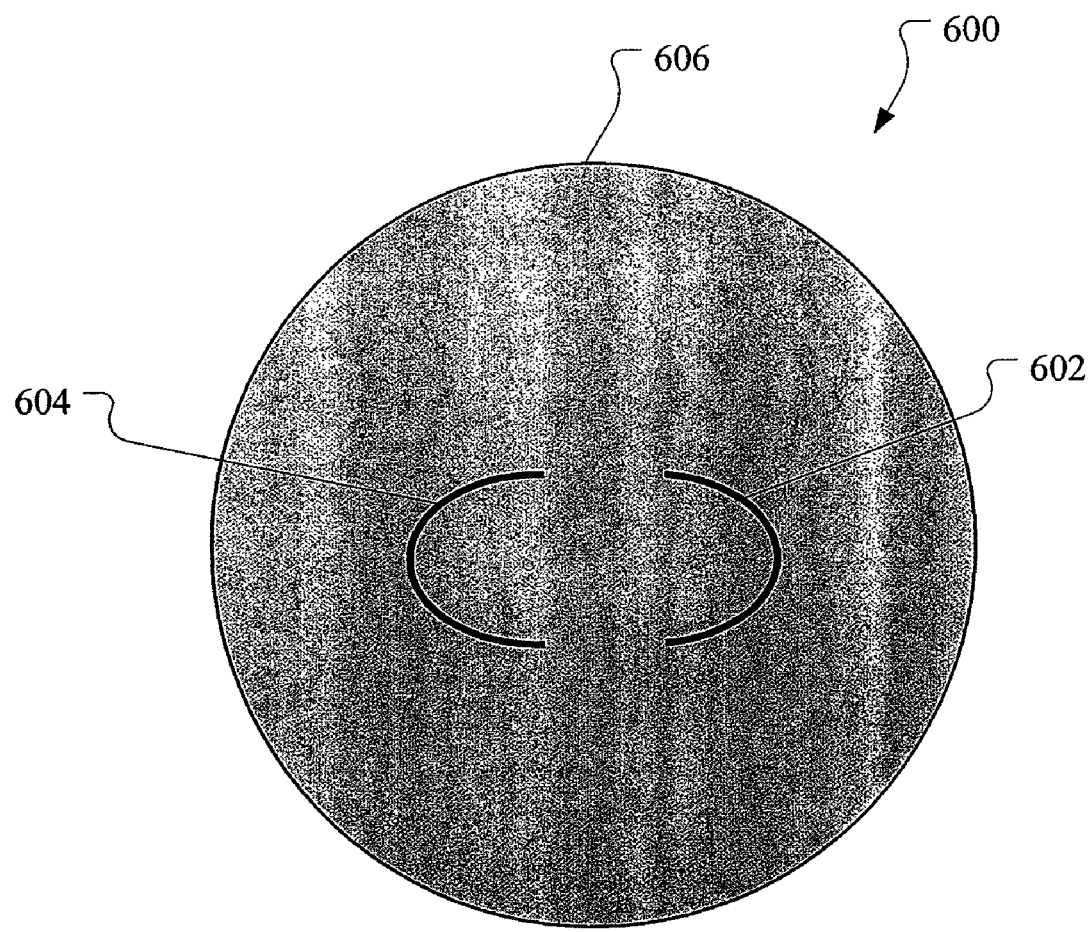
FIG. 6A presents yet another embodiment of a data disc protector in accordance with the present invention.

FIG. 6A presents yet another embodiment of a data disc protector 600 in accordance with the present invention. The data disc protector 600 is substantially disc shaped having an outer diameter 606 substantially equal to or greater than that of the data surface of the data disc for which the data disc protector 600 is designed to protect.

The data disc protector 600 differs from previous embodiments in that the protective sheet is provided with two opposing tabs 602, 604 cut into the protective sheet. The tabs 602, 604 are sized to allow penetration of a CD or other data disc provided with a central hole. The tabs 602, 604 may be sized to allow easy penetration providing a relatively loose attachment to the data disc. More preferably, the tabs 602, 604 may be sized slightly larger than the central hole of the data disc. While this requires more effort on the user's part to insert the tabs 602, 604 into the central hole, the bunching up of the protective sheet material in the tabs 602, 604 will result in a more positive attachment to the data disc. The tabs are shown as roughly half circles in shape. Other shapes are possible as long as the tabs are sized to penetrate the central hole and thereby form an attachment to the data disc.

Figure 6B:
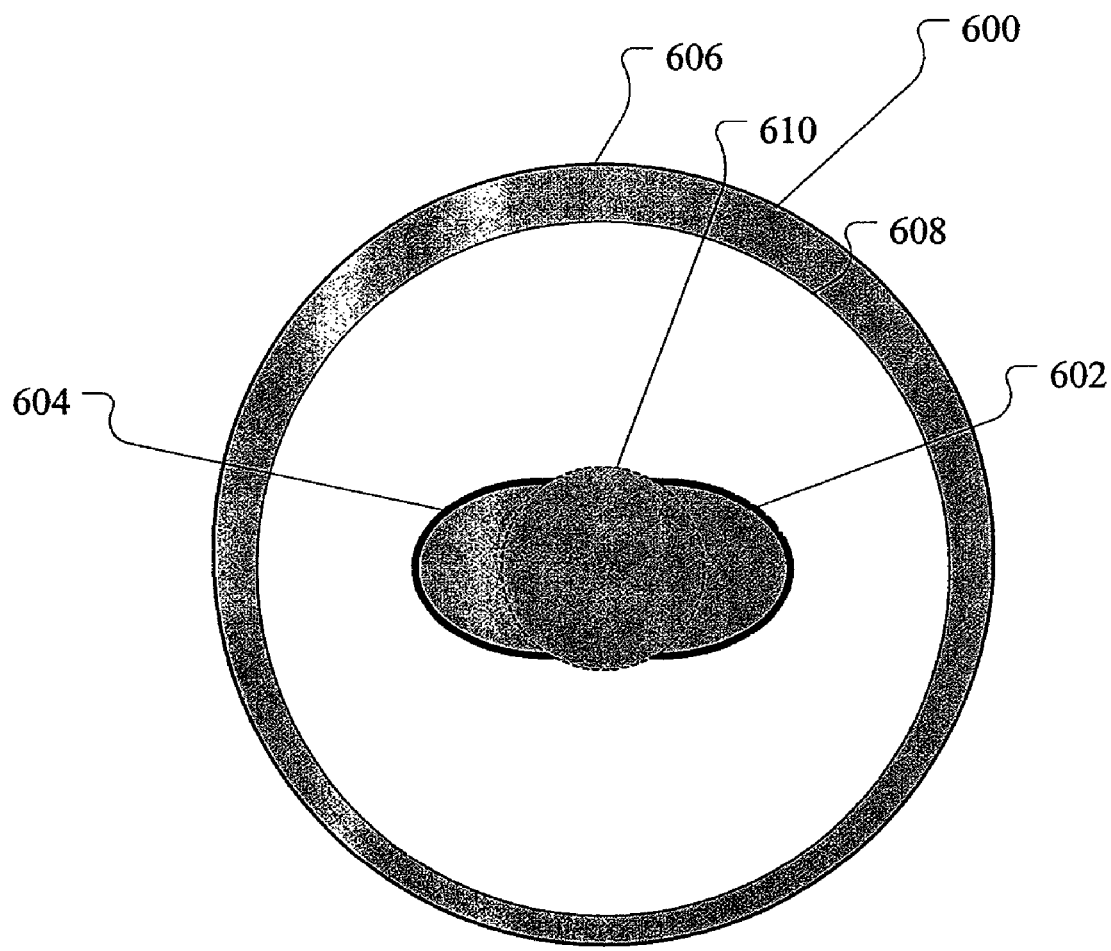
FIG. 6B shows a perspective view of the data disc protector shown in FIG. 6A installed and attached to a CD data disc.

FIG. 6B shows a perspective view of the data disc protector 600 shown in FIG. 6A installed and attached to a CD 608. In FIG. 6B the two tabs of the data disc protector 600 have penetrated the central hole 610 of the CD 608. When attached to the CD 608 in this fashion, the data disc protector 600 will be retained against the CD 608. If attached so that the tabs 602, 604 are on the label side of the CD 608, the data disc protector 600 will cover the data surface of the CD 608. If the combination is then stored in a storage case or even a storage sleeve, the data disc protector 600 will protect the data surface from contact while also forming a barrier to airborne hydrocarbons that may be emitted into the storage environment.

Figure 7:
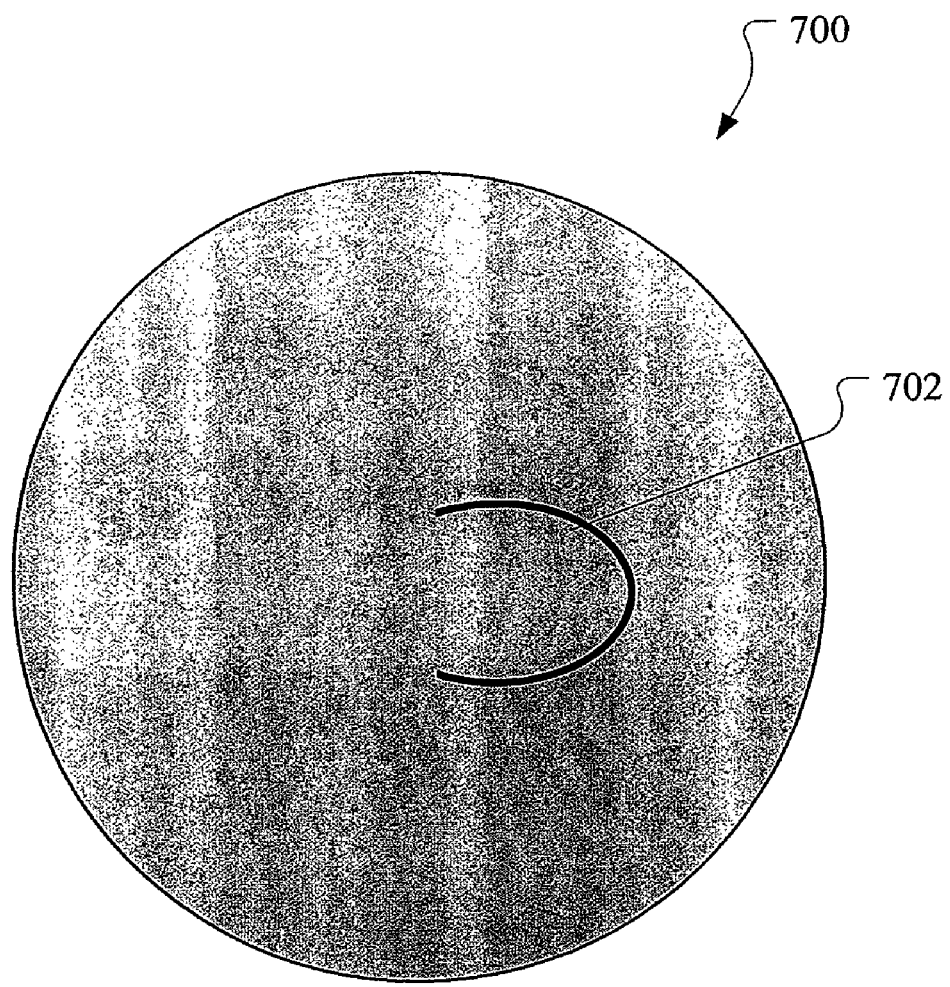
FIG. 7 shows an embodiment of a data disc protector having one tab for attaching directly to a data disc.
Figure 8:
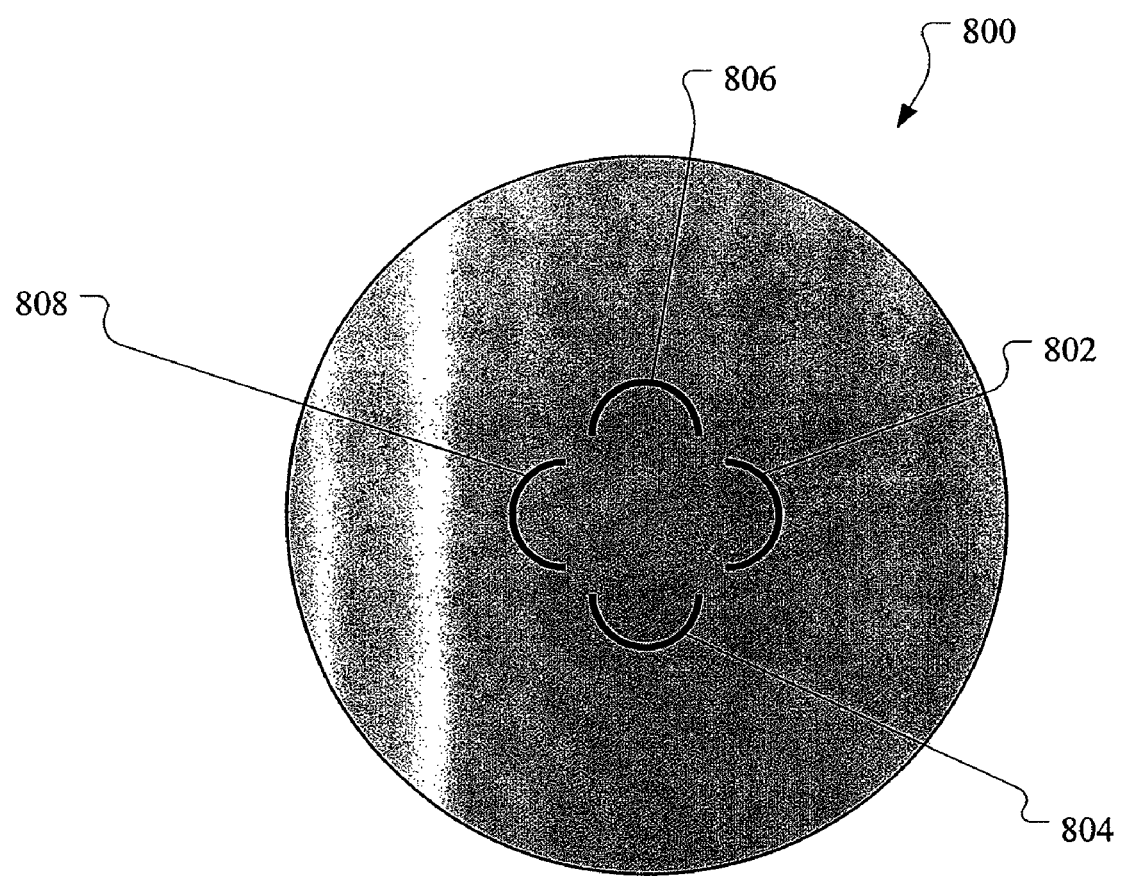
FIG. 8 shows an embodiment of a data disc protector having four tabs for attaching directly to a data disc.
Figure 9:
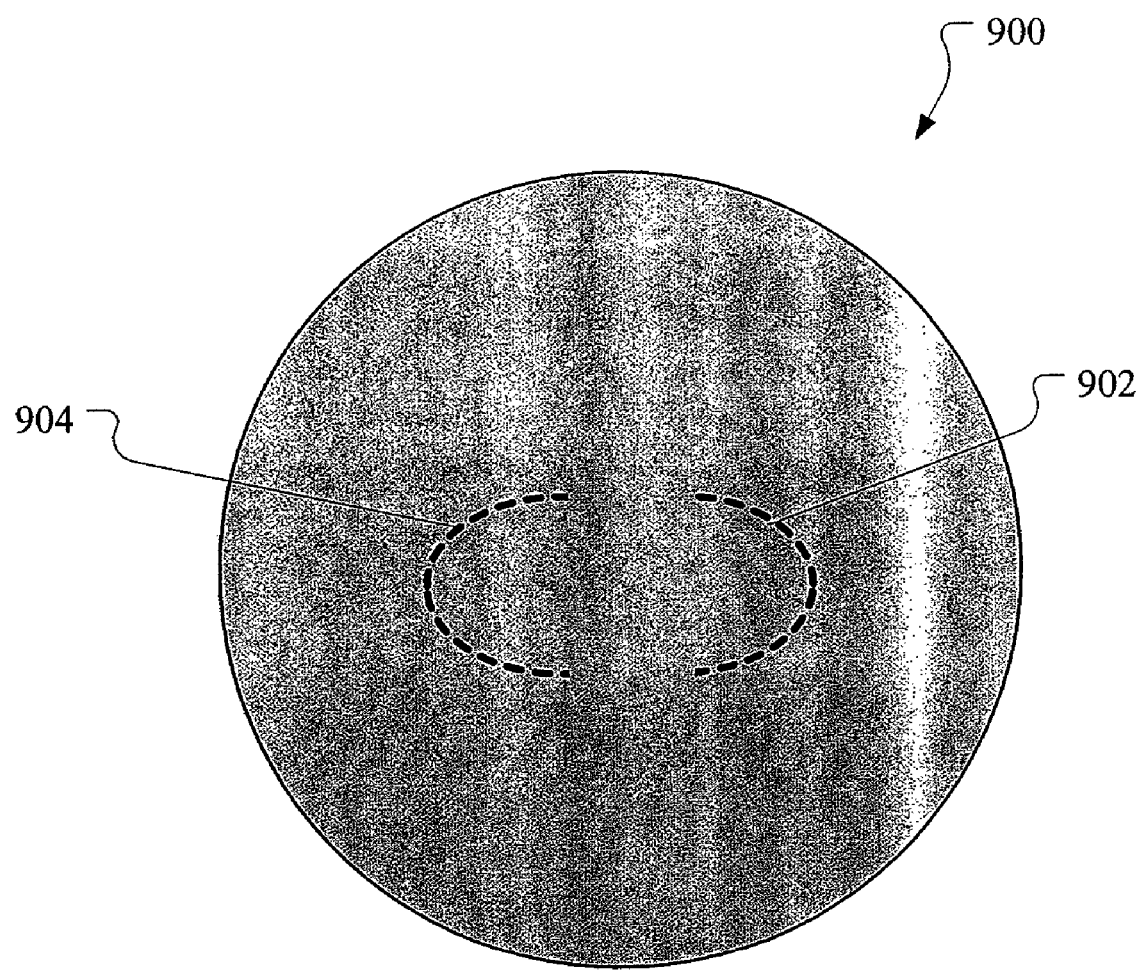
FIG. 9 shows an embodiment of a data disc protector having two tabs defined by perforations in the protective sheet.

Alternative embodiments of are possible. FIG. 7 shows an embodiment of a data disc protector 700 having one tab 702. FIG. 8 shows an embodiment of a data disc protector 800 having four tabs 802, 804, 806, 808; FIG. 9 shows an embodiment of a data disc protector 900 having two tabs 902, 904, however, the tabs 902, 904 are defined by perforations in the protective sheet. For the tabs 902, 904 to be used, the perforations must be torn out by the user. Other embodiments will be immediately suggested to those in the art.

Figure 10A:
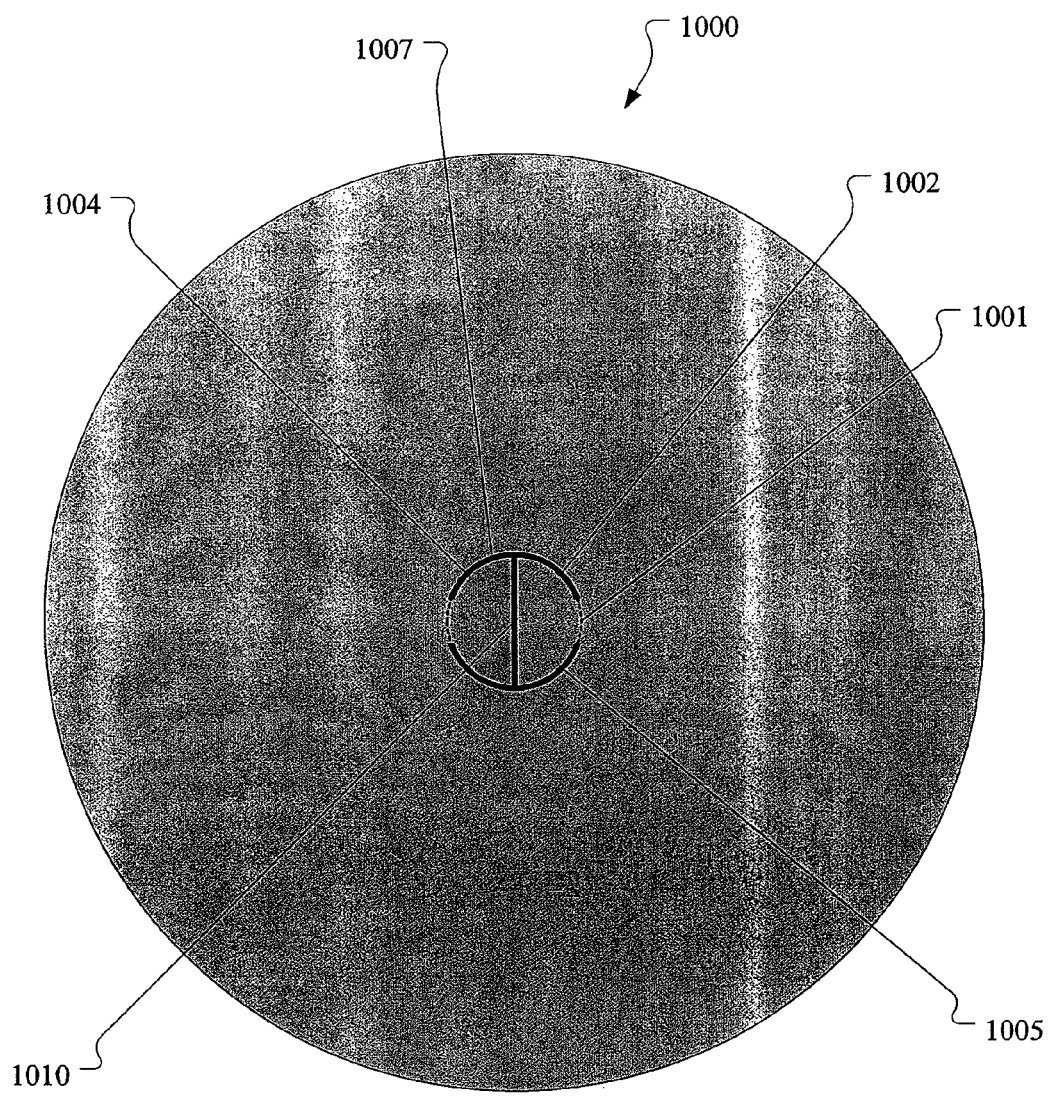
FIG. 10A presents yet another embodiment of a substantially disc-shaped data disc protector having two tabs for attaching the data disc protector to a data disc.
Figure 10B:
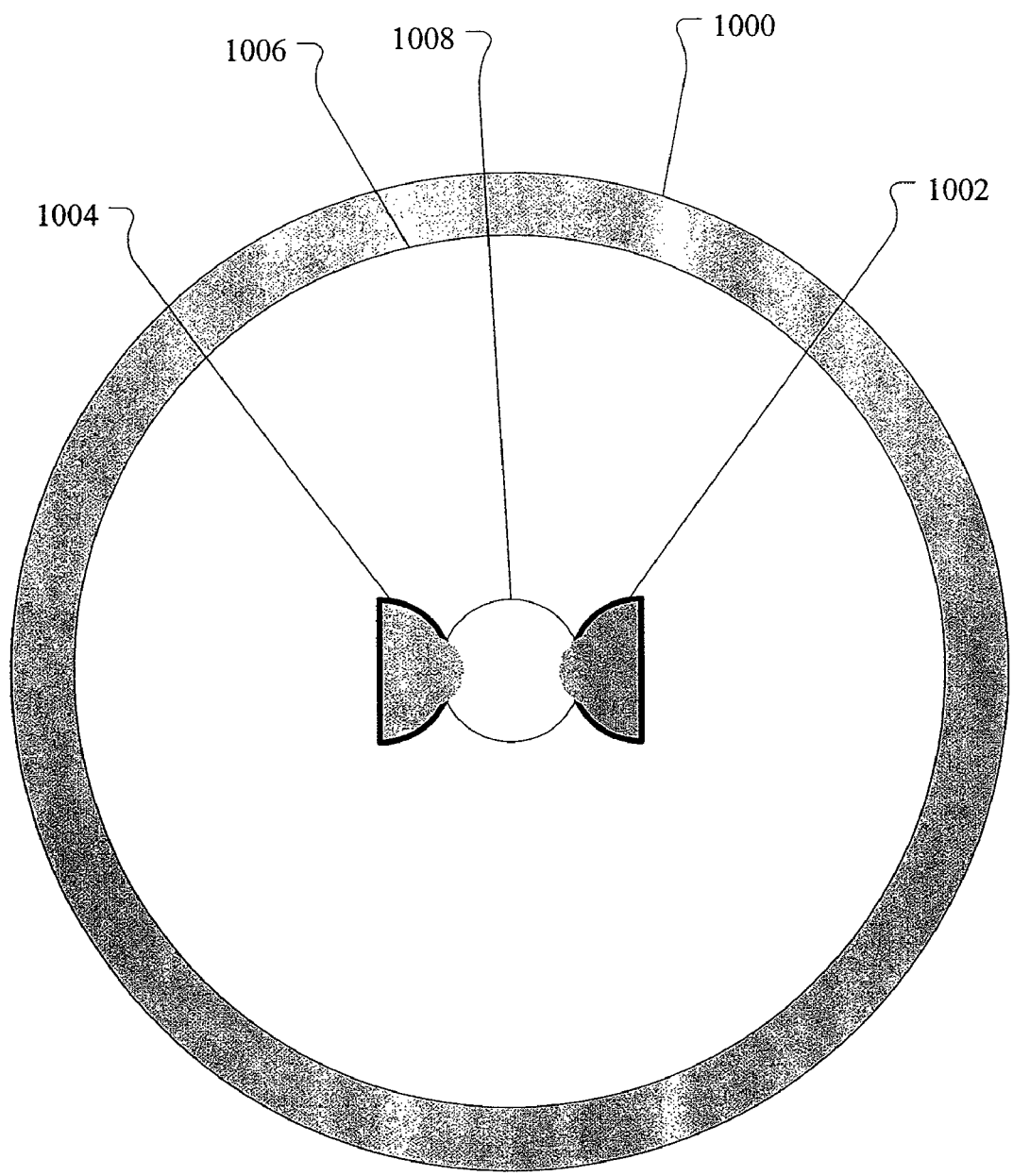
FIG. 10B shows the data disc protector of FIG. 10A installed on a data disc to form a barrier that protects one of the data disc's surfaces.

For example, FIGS. 10A and 10B present yet another embodiment of a substantially disc-shaped data disc protector 1000 having two tabs for attaching the data disc protector 1000 to a data disc 1006. The data disc protector 1000 has two tabs 1002, 1004 made by cutting two arcs 1005, 1007 into the protective sheet. In the embodiment shown, the arcs 1005, 1007 are portions of a circle 1001 substantially equal to the diameter of a central hole 1008 of the data disc 1006. Another cut bisects the circle 1001 and the two arcs 1005, 1007 thus creating two half-circle shaped tabs in the data disc protector 1000. FIG. 10A shows the data disc protector 1000 with the tabs 1002, 1004 as it could be manufactured and provided to end users.

FIG. 10B shows the data disc protector 1000 attached or installed, if you will, on a data disc 1006. Installation of the data disc protector 1000 is simple; all a user needs do is place the data disc protector 1000 against a surface of the data disc 1006 to be protected, press the tabs 1002, 1004 through the central hole 1008 of the data disc 1006 with a finger and fold the tabs 1002, 1004 down against the opposite surface of the data disc 1006. Note that two of these data disc protectors 1000 could be used, each protecting an alternate surface of the data disc 1006.

It should be noted that embodiments of the data disc protector discussed above could be using in data disc storage cases that do not positively retain the data discs while enclosed in the storage cases, such as a storage case that is simply a box sized to hold data discs. For such storage cases, a data disc protector adapted to penetrate the central hole of the data disc and attach thereto could be used for each data disc stored in the storage case. Thus preventing damage to the data surface of the storage discs. Embodiments of the data disc protector disclosed herein may be sold individually or provided with data disc storage cases, either preinstalled in the storage case or as a kit that is assembled by the end user.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, small features could be added to the protective sheet that enhance the data disc protector's ability to attach to a data disc or ensure proper positioning. A small wire could be included in the tabs of the data disc protector, for instance that would ensure that the tabs when pressed through a disc's central hole and folded down, positively attach to the data disc. Yet another improvement would be to provide a data disc protector with a hub thereon. Such a protector could be used in a storage case for multiple data discs comprising a simple box with no other retention devices. The hub on the data disc protectors would prevent them from moving relative to the data discs during storage. Numerous other changes may be made which will readily suggest themselves to those skilled in the art and which are encompassed in the spirit of the invention disclosed and as defined in the appended claims.

What is claimed is:

1. A data disc protecting system comprising:
   a data disc having an optically readable data surface;
   a data disc protector comprising air-permeable nonwoven polypropylene;
   a disc storage case comprising a hub contacting an inner annular region of the data disc protector;
   wherein the disc storage case comprises a contact ring which contacts an outer annular region of the data disc protector; and
   wherein the optically readable data surface, the data disc protector, the inner annular region, and the outer annular region together form a first cavity between them.

2. The data disc protecting system of claim 1, wherein the data disc protector and a base portion of the disc storage case, the base portion attached to the hub form together a second cavity between them.

3. The data disc protecting system of claim 1, wherein the air-permeable nonwoven polypropylene is water-permeable.

4. The data disc protecting system of claim 1, wherein the air-permeable nonwoven polypropylene is spunbonded.

5. The data disc protecting system of claim 1, wherein the nonwoven air-permeable polypropylene is meltblown.

* * * * *